United States Patent

Johnson

[15] 3,690,555
[45] Sept. 12, 1972

[54] HYGIENIC UNIT

[72] Inventor: Russell D. Johnson, 8912 Haskell, Sepulveda, Calif. 91343

[22] Filed: Jan. 27, 1971

[21] Appl. No.: 110,125

[52] U.S. Cl. .......................... 239/61, 137/468, 239/75
[51] Int. Cl. .............................................. B05b 7/00
[58] Field of Search ...... 236/12; 239/61, 75, 570, 71, 239/74, 195, 197, 571, 390; 137/457, 468, 205; 73/363.7, 363.9

[56] References Cited

UNITED STATES PATENTS

| | | | |
|---|---|---|---|
| 2,997,239 | 8/1961 | Priesmeyer | 236/12 |
| 1,683,911 | 9/1928 | Morris | 239/197 X |
| 2,626,524 | 1/1953 | Harman | 239/71 X |
| 3,086,749 | 4/1963 | Frye | 251/205 |
| 3,131,868 | 5/1964 | Coleman | 239/390 X |
| 2,344,150 | 3/1944 | Judell | 239/571 X |
| 2,021,427 | 11/1935 | Peo | 137/468 X |

OTHER PUBLICATIONS

Sarco Reference— A.I.A. File 29— D21 Sarco No. 140— June, 1936

*Primary Examiner*—M. Henson Wood, Jr.
*Assistant Examiner*—Edwin D. Grant
*Attorney*—Beehler, Arant & Jagger

[57] ABSTRACT

A hygienic unit is provided for delivering water at a controlled temperature to a nozzle which provides a jet or stream of water which can be applied by a person for cleansing or sanitary purposes to any part, organ, or cavity of the body. The unit includes a manual adjusting knob for initially setting a thermostatic motor which cooperates with a valve assembly for controlling a flow of hot water for mixing with a flow of cold water such as to provide a mixed flow of water having a selected temperature. The thermostatic motor then provides for repositioning the valve assembly as required to maintain the selected temperature of the mixed water being delivered by the hygienic unit.

2 Claims, 4 Drawing Figures

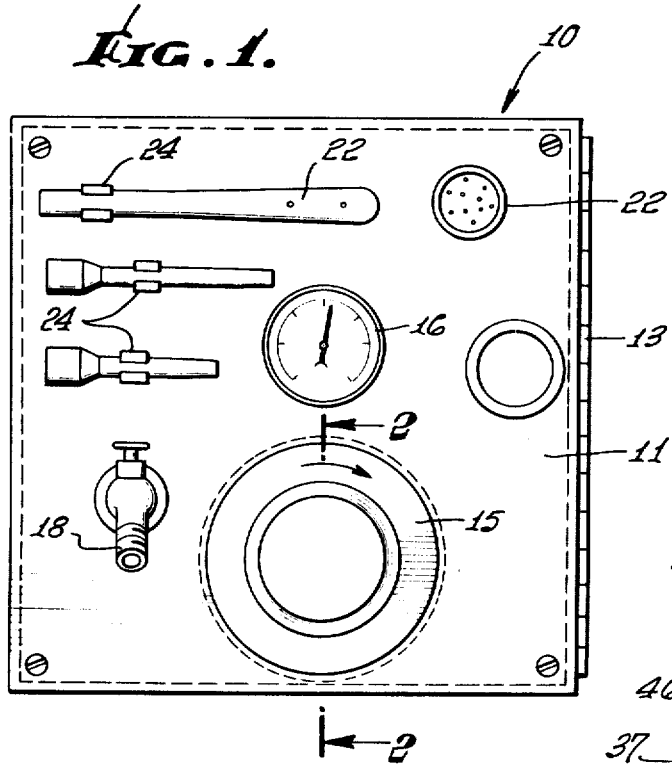
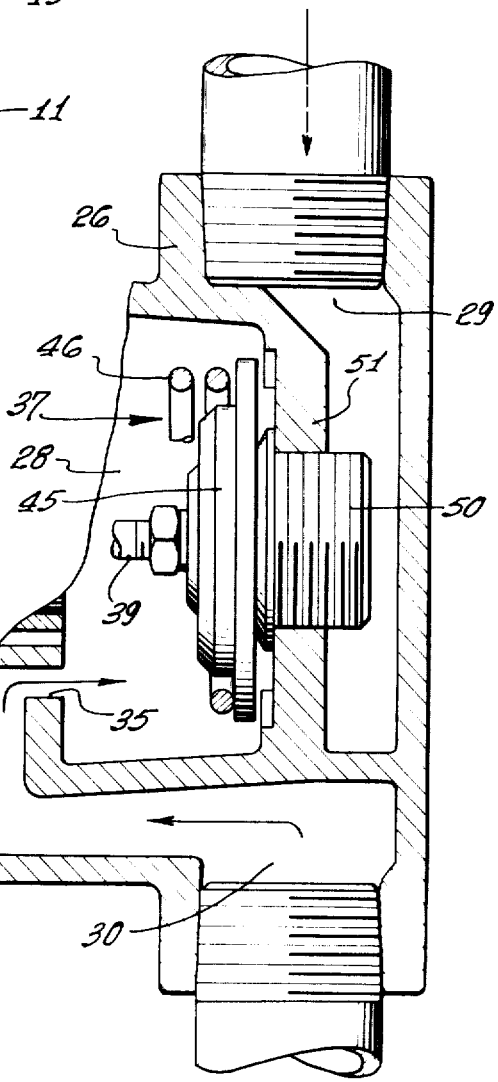
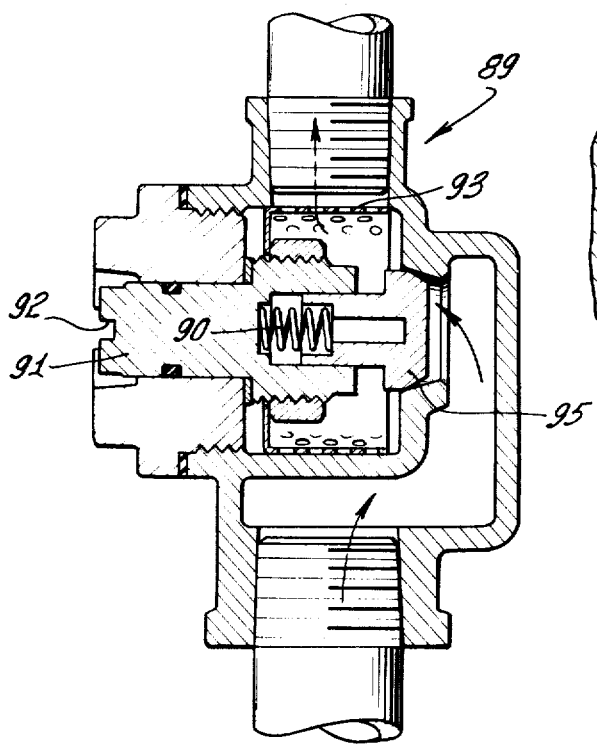
INVENTOR
RUSSELL D. JOHNSON
BY
Beehler & Arant
ATTORNEYS.

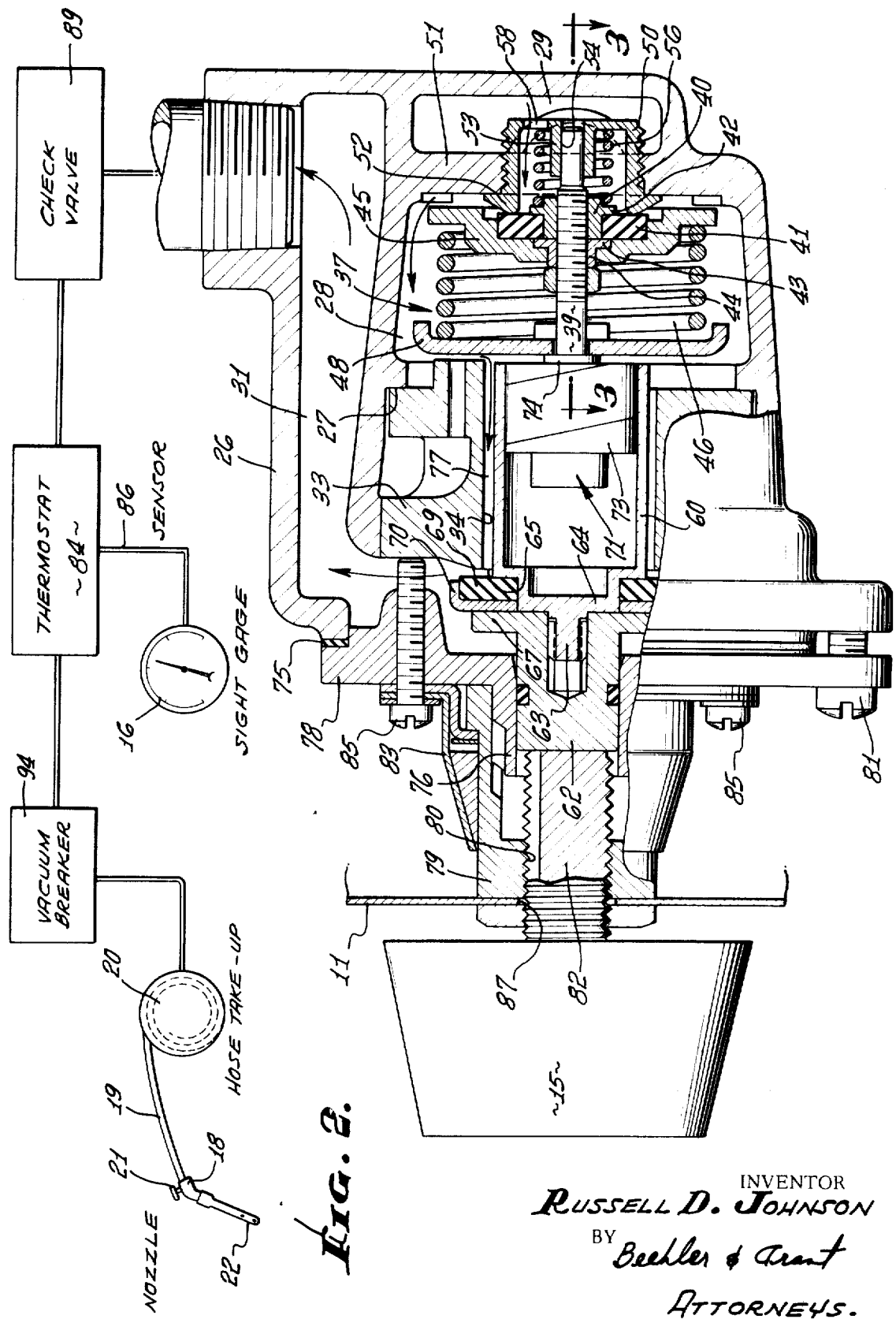

HYGIENIC UNIT

This invention relates to hygienic units and more particularly to such a unit for supplying a jet or current of water for cleansing purposes to any part, organ, or cavity of the body.

When a hygienic unit is provided for cleansing or sanitary purposes because of the sensitivity of the areas of the body involved it is highly desirable for the comfort of the person using the unit to be able to manually select the temperature of the water being delivered for this purpose. It is also very desirable to assure the user that the water being delivered by the unit for cleansing purposes is automatically maintained at the selected temperature even though the temperature of the hot and cold water supplied to the unit should vary. It is also very important to assure the user that the temperature of the water delivered by the unit for cleansing purposes does not suddenly change to extremes such as in the case of a cold water supply failure, for example, which could cause scalding water to be applied to the body of the person.

Accordingly, the primary object of the invention is to provide a novel hygienic unit which provides a jet or stream of temperature controlled water to be used by a person for cleansing purposes.

Another object of the invention is to provide a hygienic unit which provides for effectively maintaining the temperature of the water supplied by the unit for cleansing purposes once the temperature has been manually set by the user.

Briefly, the hygienic unit of the present invention includes a housing having a mixing chamber with a hot water inlet, a cold water inlet and a mixed water outlet. The water flow from the cold water inlet to the mixing chamber is by way of an open passageway while the flow of hot water from the hot water inlet into the mixing chamber is controlled by a valve assembly. A thermostatic motor is provided for positioning the valve assembly. A manual adjusting means is used to initially set the thermostatic motor and valve assembly to control the flow of hot water into the mixing chamber such that the water mixture delivered by the unit is at a desired temperature. The thermostatic motor then provides for repositioning the valve assembly as required to maintain the temperature of the mixed water selected by the manual adjusting means. The water provided at the mixed water outlet is delivered by way of a flexible hose to a nozzle which provides a jet of water to be used by a person for cleansing purposes.

These and other objects of the present invention, together with the advantages and features thereof, will become apparent from the following description in conjunction with the accompanying drawings, in which:

FIG. 1 is a front view of a panel of a cabinet used to enclose the hygienic unit of the present invention;

FIG. 2 is a sectional view of the mechanism in the hygienic unit for controlling the temperature of the water being supplied for cleansing purposes;

FIG. 3 is a sectional view taken in the direction of the arrows 3—3 in FIG. 2 showing the hot and cold water inlets to the hygienic unit; and FIG. 4 is a sectional view of check valve used on the mixed water outlet of the hygienic unit.

Referring to FIG. 1 of the drawings a cabinet 10 is shown for the hygienic unit of the present invention. The cabinet 10 includes a front panel 11 on which parts of the hygienic unit are mounted. The panel 11 is provided with a hinge 13 on one side thereof about which the panel can swing to permit access to the parts of the hygienic unit extending into and included in the cabinet. The parts of the hygienic unit of the panel 11 include an adjustment knob 15 which can be rotated in either direction to vary the amount of hot water that enters the unit for mixing with cold water entering the unit such that the water supplied by the unit for cleansing purposes will be at a desired temperature as indicated by a temperature gauge 16. A nozzle 18 which can be dismounted from the panel 11 is connected to a flexible hose 19 on a take-up reel 20 located in the cabinet behind the panel 11. The hose 19 and reel 20 are illustrated in FIG. 2. The nozzle 18 receives the mixed water whose temperature is regulated by the unit. The passage of the water through nozzle 18 is controlled by manually depressing a valve 21 on the nozzle. Various spray and jet devices 22 held on the panel 11 by clips 24 are available for attachment to the end of the nozzle 18 for use in cleaning the body.

Reference will next be made to FIGS. 2 and 3 which shows a mechanism included in the hygienic unit for selecting and controlling the temperature of the water to be delivered by the unit for cleansing purposes. The mechanism includes a housing 26 provided with a mixing chamber 28 having a hot water inlet port 29, a cold water inlet port 30 (FIG. 3), and a mixed water outlet port 31. The flow of cold water from the cold water inlet port 30 into the mixing chamber 28 is by way of an open passageway 35. The flow of hot water from the hot water inlet port 29 into the mixing chamber 28 is controlled by a valve assembly 37. The valve assembly 37 which is located within the mixing chamber 28 includes a shaft 39 on which a sleeve 40 is threadably mounted. A hot water disc 41 is positioned on the sleeve 40 to bear against a flange 42 thereof. Disc 41 is further held in position on the sleeve 40 by the flange 43 of a retainer nut 44 threadably engaging the shaft 39. Positioned about the shaft 39 and against the retainer 44 so as to form a backing for the hot water disc 41 is a valve spring support 45. The outer annular surface of the spring support 45 engages the back end of the valve spring 46. A spring retaining cup 48 freely positioned on shaft 39 engages the front end of the valve spring 46. A valve inlet fixture 50 threadably engages an opening in the wall 51 separating the hot water inlet port 29 from the mixing chamber 28. The inner end of the valve inlet fixture 50 within the chamber 28 provides a hot water seat 52 for the hot water disc 41 of the valve assembly 37. Extending inwardly from the outer end of the valve inlet fixture 50 is an internal boss 53 having a cylindrical bore 54 for slidably receiving the end of the shaft 39 of valve assembly 37. A return spring 56 encircling boss 53 engages the flange 42 of sleeve 40 to bias the valve assembly 37 forward against the action of the valve spring 46. The outer end of the valve inlet fixture 50 is provided with one or more openings 58 which permit the hot water in the hot water inlet port 29 to flow into the mixing chamber 28 depending upon the setting of the hot water disc 41 of the valve assembly 37 relative to the hot water seat 52.

Positioned within the housing 26 so as to bear against inner shoulder 27 thereof is a wall insert 33 provided with a cylindrical opening 34 in the center thereof. Within cylindrical opening 34 is concentrically positioned a cylindrical member 60. An adaptor 62 threadably engages a stud 63 formed on the head 64 of cylinder member 60. Positioned on the head 64 and supported by a flange 67 on adaptor 62 is a shut-off disc 60 provided with cupped retainer 70. Shut-off disc 69 radially extends beyond cylindrical member 60 so as to seat against the outer end 65 of the wall insert 33 when the cylindrical member 60 is moved inwardly against the valve assembly 37. A thermostatic motor 71 formed of a bi-metallic coil 73 is positioned within the cylindrical member 60. Motor 71 has its outer coil surface secured to the inner wall 61 of the cylindrical member 60 and its inner coil surface attached to a tube 74 which slidably engages the front end of the shaft 39 of valve assembly 37. In response to the action of motor 71 to an increase in the temperature of the water mixture passing thereby from the chamber 28 to the outlet port 31, the inner tube 74 of member 60 bears against the retainer cup 48 to compress the valve spring 46.

Housing 26 is provided with a front cover 78 held thereon with a sealing gasket 75 by screws 81. Mounted on a cylindrical extension 76 of the cover 78 is a sleeve 79 which is provided with a threaded opening 80 on the front portion thereof for receiving an adjustment stem 82. Sleeve 79 is retained in position on the extension 76 of the cover 78 with its axis in line with the axis of the cylindrical member 60 by a retaining ring 83 which is held on the cover 78 by screws 85. It should be noted that the screws 85 extend into the housing 26 to engage and hold the wall insert 33 in position against the inner shoulder 27 of the housing 26.

Adjustment knob 15 is connected to the end of adjustment stem 82 which extends through an opening 87 in the panel 11. It should be noted that the stem 82 moves along its axis relative to the fixed sleeve 79 which is rotated by the knob 15. The end of stem 82 contacts the end of the adaptor 62 attached on the head 64 of the cylindrical member 60. The adaptor 62 has a sliding fit within extension 76 such that when the stem 82 is advanced by rotating knob 15, the thermostatic motor 71 bears against the valve assembly 37 positioning the hot water disc 41 more closely against the hot water seat 52.

Considering next the operation of the mechanism for controlling the temperature of the water to be used for cleansing purposes, it is noted that the opening 58 provided on the end of the valve inlet fixture 50 permits hot water to pass from the hot water inlet port 29 past the hot water disc 41 controlled by valve assembly 37 to the mixing chamber 28 which also receives the cold water which enters through the cold water inlet port 30, as shown in FIG. 3. The hot and cold water supplies mix in the chamber 28 and the resultant mixture flows across the annular opening 77 formed between the cylindrical opening 34 of wall insert 33 and the cylindrical member 60 concentrically positioned therein, and then past the shut-off disc 69 into the mixed water outlet port 31. The thermostatic motor 71 within the cylindrical member 60 responds to the surrounding water mixture flowing thereacross via annular opening 77 to position the valve assembly 37 to maintain the desired cleansing water temperature.

It should now be clear that the temperature of the cleansing water delivered by the hygienic unit can be initially manually varied by turning the adjustment knob 15. Turning the knob 15 clockwise raises the mixture water temperature, and turning the knob counter-clockwise lowers the water mixture temperature. If, due to variations of the temperature of either the hot or cold water supply the temperature of the water mixture rises above the initial temperature setting manually set by turning knob 15, the thermostatic motor expands and the inner tube 74 thereof bears against spring retaining cup 48 positioning the valve assembly 37 to the right in the showing of FIG. 2. As a result the hot water flow decreases and the cold water flow increases in mixing chamber 28. Thus the water mixture temperature is brought down to the desired lowered temperature. The reverse occurs when the water mixture temperature is lower than the temperature setting initially set by turning adjustment knob 15 on panel 11. It is thus clear that a change in water temperature pressure of either the hot or cold water supply will cause the thermostatic motor 71 to reposition the valve assembly 37 to maintain the desired delivery temperature.

It should be noted that turning the knob 15 completely clockwise seats the shut-off disc 69 against the outer end 65 of wall insert 33 and completely stops the flow. At the same time the hot water disc 41 seats against the hot water seat 52, thus preventing the interchange of the hot and cold water supply. It should be further noted that in case of a cold water supply failure, the thermostatic motor 71 rapidly expands until the hot water disc 41 is seated against the hot water seat 52. Thus water flow through the housing 26 of the hygienic unit stops and scalding cannot occur.

As further indicated by block diagram in FIG. 2, the flow of the mixture of water from the housing 26 is directed through a valve 89 the details of which are shown in FIG. 4. Note that the check valve 89 is provided with a spring 90 which is interposed between an adjustable member 91 and the valve seat 95. Member 91 is provided with notch 92 on the end thereof for receiving the end of a screwdriver for adjusting the position of member 91 and consequently and pressure at which check valve 89 operates in order that the force of the flow of water mixture delivered by the hygienic unit is satisfactory for the cleansing purpose intended. The check valve 89 also includes a strainer 93 to assure that no foreign substances are carried by the flow of cleansing water. The line leading to nozzle 18 is provided with a thermostat 84 having a sensor 86 which controls the temperature sight gauge 16. A vacuum breaker 94 is further provided just prior to the water being delivered to the flexible hose 19 on the take-up reel 20 which has the nozzle 18 attached to the end thereof.

From the above description it will be apparent that there is thus provided a device of the character described and possessing the particular features of advantage before enumerated as desirable, but which obviously is susceptible of modification in its form, proportions, detailed construction and arrangement of parts without departing from the principal involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A personal hygenic unit for providing a jet of water at a controlled temperature for use by a person for cleansing purposes comprising a housing having a front panel, said housing having a mixing chamber therein, a cold water inlet, a hot water inlet, and a mixed water outlet, a valve assembly in said housing for controlling the flow of hot water from said hot water inlet to said mixing chamber, a means on said valve assembly for manually adjusting the setting of said valve assembly such that the temperature of the water in said mixing chamber is at a desired temperature, said means having an adjustment knob on said panel, a thermostatic motor responsive to the water in said mixing chamber for automatically adjusting the setting of said valve assembly to maintain the temperature of the water in said mixing chamber at the desired temperature, a liquid line in the housing for mixed water, said liquid line being connected at one end to the mixed water outlet, a length of flexible hose in the housing connected to the liquid line at the other end for receiving the water from the mixed water outlet, a nozzle on the end of said flexible hose having attachment means at the outflow end for providing the jet of water to be used for cleansing purposes, and support means on the panel releasably holding said nozzle, a check valve in said liquid line and located in said housing, said check valve having means within the housing and remote from the panel for adjusting the check valve, a thermal sensor in said liquid line, a temperature gauge on said panel in communication with said sensor, and an assortment of attachments releasably held on said panel, said attachments being engageable alternatively with the attachment means of said nozzle.

2. A personal hygenic unit as in claim 1 wherein there is a vacuum breaker in the liquid line at a location intermediate the nozzle and the check valve.

* * * * *